May 23, 1972   SVEN-ERIK MALMSTROM   3,664,675
SEAL BETWEEN ROTATING PARTS, MOVEMENT
OF WHICH IS RELATIVE TO EACH OTHER
Filed May 5, 1971

INVENTOR:
SVEN ERIK MALMSTROM
BY Howson & Howson
ATTYS.

United States Patent Office 3,664,675
Patented May 23, 1972

3,664,675
SEAL BETWEEN ROTATING PARTS, MOVEMENT OF WHICH IS RELATIVE TO EACH OTHER
Sven-Erik Malmstrom, Reftele, Sweden, assignor to Forsheda Gummifabrik Aktiebolag, Forsheda, Sweden
Continuation-in-part of application Ser. No. 809,743, Mar. 24, 1969. This application May 5, 1971, Ser. No. 140,425
Claims priority, application Sweden, Apr. 1, 1968, 4,276/68
Int. Cl. F16j 15/32
U.S. Cl. 277—84
5 Claims

ABSTRACT OF THE DISCLOSURE

A seal for relatively rotatable members such as a shaft member and a wall member having a sealing surface disposed generally transversely to the axis of the shaft member, comprising an annular body portion adapted to be mounted on the shaft member, a flexible lip projecting angularly from said body portion and having at least one circumferential rib projecting from the lip engaging the sealing surface of the wall member and a plurality of fin-shaped elements projecting radially from said rib disposed generally parallel to the sealing surface, said fin-shaped elements adapted to press with a light pressure against the sealing surface with freely suspended side edges and which, due to friction upon relative rotation of the members, deflect rearwardly in relation to the direction of movement of the sealing rib and sealing surface thereby providing a pumping effect directed radially from the sealing rib.

---

This is a continuation-in-part application of my prior application Ser. No. 809,743, filed Mar. 24, 1969, for "Seal Between Rotating Parts, the Movement of Which is Relative to Each Other" and now abandoned.

The present invention relates to a seal for relatively rotatable members and more particularly to a so-called axial seal. In these applications the seal is usually mounted on a shaft member and has a sealing edge engaging a wall extending transversely of the shaft, for example the wall of the housing. These seals usually, therefore, include an annular body portion mounted on one of the members such as the shaft having a flexible sealing lip in sliding contact with the sealing surface of the other member, for example a stationary wall of the housing which extends generally transversely to the shaft.

It has been found that seals of this type are more effective if they are provided with some means for providing a hydrodynamic or pumping effect. For example, in some instances these seals have included inclined vanes attached to the sealing lip. However, these seals are operative only when the relative directional movement of the rotating part is the same. In other words, on rotation in an opposite direction the pumping effect produces leakage. There are also bi-directional seals which operate on the principle of a pumping effect in two directions achieved by fixed vanes connected to the sealing edge. These seals are generally termed "flip-flop" seals and in general are of the so-called radial seal type. In other words, radial seals are usually mounted on a shaft and engage a surface generally parallel to the cylindrical surface of the shaft. These so-called "flip-flop" seals have proved to be of limited value and have not provided an absolute sealing effect even if the bi-directional seal appears to be superior to the conventional lip seal. There are also perforated rotating sealing elements which result in adequate sealing on rotation in both directions but which have the disadvantage that they can be used only in applications where the oil level is below the sealing location in a stationary position.

The present invention is directed to a seal adapted to provide a complete and adequate seal upon relative rotation of the members in either direction and which is designed to overcome the disadvantages and drawbacks of the prior seals discussed above. The seal of the present invention differs from the previously known seals in that the seal has a flexible lip with a circumferential rib adapted to engage the sealing surface and a plurality of fin-shaped elements which extend in a generally perpendicular direction relative to the sealing rib and which are adapted to contact the sealing surface at a low-pressure in a plane which is essentially parallel to the sealing surface. Thus, on relative rotation between the parts, the fins are deflected due to the influence of friction and in a direction opposite to that of the relative motion of the sealing ring. A seal of this type provides an effective seal and a pumping effect irrespective of direction of rotation of the members relative to one another.

These and other objects o the present invention are hereinafter more fully set forth and described with reference to the accompanying drawings wherein.

Figure 1:
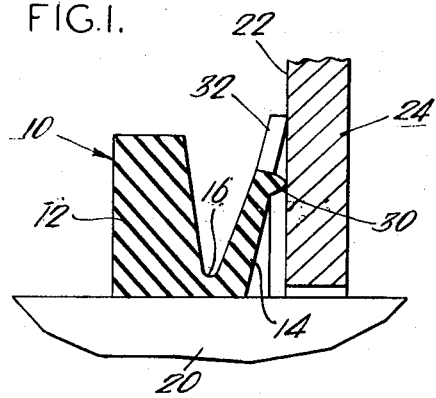
FIG. 1 is a view of an axial seal in accordance with the present invention mounted on a rotary shaft in sealing engagement with the transverse wall of a stationary housing.
Figure 2:
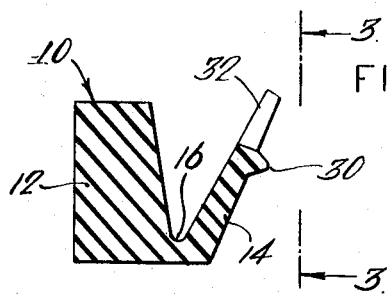
FIG. 2 is a sectional view through the axial seal shown in FIG. 1.

Referring now to the drawings and particularly to FIGS. 1 and 2 thereof, there is illustrated an axial seal in accordance with the present invention generally designated by the numeral 10. The seal comprises an annular body portion 12 and a flexible sealing lip 14 projecting at an angle from the body portion and connected thereto by a circumferentially extending hinge 16. The inner diameter of the body portion is preferably slightly less then the diameter of the shaft so that when the seal is assembled, it assumes a fixed position on the shaft. The seal is made of a flexibly resilient material such as rubber and is adapted to be mounted on a shaft 20 so that the sealing lip 14 confronts and engages the sealing surface 22 of a stationary member 24 such as the wall of the housing, the sealing surface 22 of which extends generally transversely to the axis of rotation of the shaft.

Figure 3:
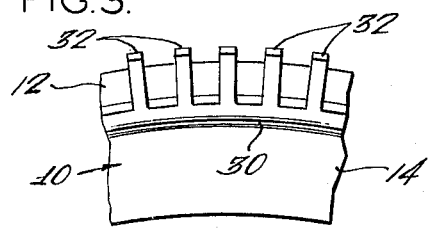
FIG. 3 is a view taken on lines 3—3 of FIG. 2.

The sealing lip 14 terminates in a circumferentially extending rib 30 which is adapted to be in contact with the sealing surface 22 about its periphery. A plurality of fins 32 project from the outer terminal edge of the sealing lip 14 and in the present instance as illustrated in FIG. 3 are circumferentially equi-spaced apart such that they are similar to the teeth on a sprocket. The thickness of the fins varies between 0.3 mm. and 1 mm. according to the radial extension of the fin from the terminal edge of the sealing lip 14. The relationship is preferably less than 1:2. To achieve this effect, the thickness of the fin may be varied along the length so that the fin may be thickest at the sealing edge adjacent the counter terminal end of the sealing lip 14. By this arrangement, the fins will serve as scrapers and as a consequence of their deflection, foreign particles, liquids and the like which come in contact with the fins, will be projected outward relative to the sealing rib 30. This is true in either relative direction of rotation of the shaft and sealing surface relative to one another.

Figure 4:
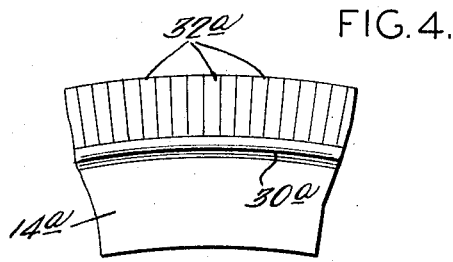
FIG. 4 is a fragmentary view similar to FIG. 3 showing a modified fin construction.
Figure 5:
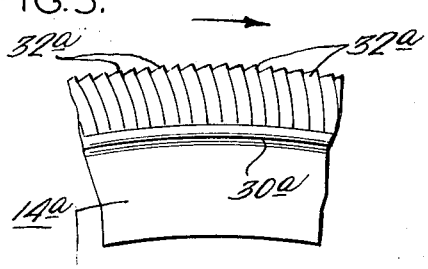
FIG. 5 is a fragmentary view similar to FIG. 4.

FIGS. 4 and 5 show a slight modification of the axial seal in accordance with the present invention. In this instance, the seal is identical in configuration and includes a sealing lip 14a, and a circumferentially extending rib 30a. However, in the present case the fins 32a are produced by radial cuts through the extension of the sealing lip. In this instance, on relative rotation of the members, the fins 32a will deflect backwards as shown in FIG. 5 and adopt a cupped form to project oil and other material radially outwardly.

Figure 6:
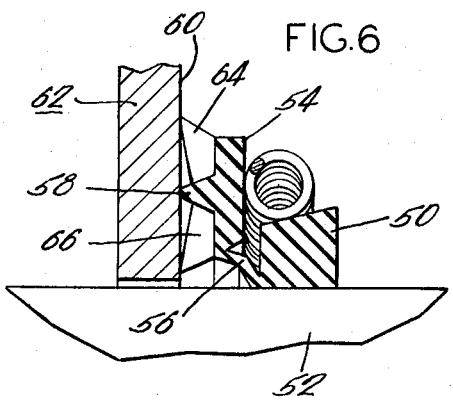
FIG. 6 is a view of a modified form of axial seal assembled on a shaft.

There is shown in FIG. 6 a modified form of the axial seal in accordance with the present invention. In this embodimnet the seal is a double-acting axial seal and comprises an annular body portion 50 adapted to be mounted on a shaft member 52 and a sealing lip 54 extending from one axial end face of the body portion 50 and connected by means of a flexible hinge 56. The sealing lip 54 has a circumferentially extending rib 58 which engages the sealing surface 60 of the stationary wall member 62, the sealing surface 60 as in the previously described embodiment extending generally transversely to the axis of rotation of the shaft 52 on which the seal is mounted. The sealing rib 58 is pressed against the sealing surface 60 by means of a garter spring 63 mounted on the body portion of the seal. In the present instance the rib 58 projects from the central portion of the sealing lip 54 and there are provided a plurality of circumferentially spaced radially extending fins projecting from either side of the rib 58, the fins projecting radially outwardly from the rib 58 being designated by the numeral 64, and the fins projecting radially inwardly from the ribs 58 being designated by the numeral 66.

Figure 7:
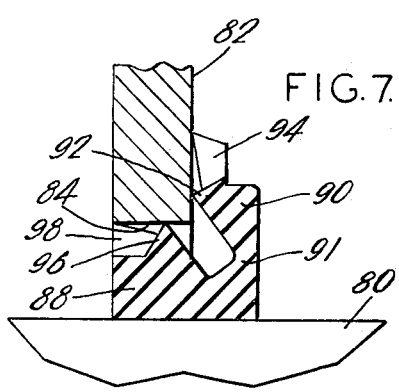
FIG. 7 is a combination seal in accordance with the present invention shown in the assembled position.

There is illustrated in FIG. 7 a combination seal adapted to be mounted on a rotating shaft 80 to engage in the present instance a sealing surface 82 extending transversely to the axis of rotation of the shaft 80 and a sealing surface 84 extending parallel to the axis of the shaft. The seal comprises an annular body portion 8 and a flexible sealing lip 90 projecting from one axial end of the body portion and connected thereto by a hinge 91. The sealing lip terminates in a circumferential rib 92 engaging the sealing surface 82 and a plurality of fins 94 projecting from the terminal edge of the lip also engaging the sealing surface 82. The body portion is also formed with a circumferential sealing rib 96 engaging the surface 84 and a plurality of axial fins 98 also engaging the sealing surface 84.

I claim:

1. A seal for relatively rotatable members such as a shaft member and a wall member having a sealing surface disposed generally transversely to the axis of the shaft member, comprising an annular body portion adapted to be mounted on the shaft member, a flexible lip projecting angularly from said body portion and having at least one circumferential rib projecting from the lip engaging the sealing surface of the wall member and a plurality of fin-shaped elements projecting radially from said rib disposed generally parallel to the sealing surface, said fin-shaped elements adapted to press with a light pressure against the sealing surface with freely suspended side edges and which, due to friction upon relative rotation of the member, deflect rearwardly in relation to the direction of movement of the sealing rib and sealing surface thereby providing a pumping effect directed radially from the sealing rib.

2. A seal as claimed in claim 1 wherein the fin-shaped elements are circumferentially equi-spaced apart.

3. A seal as claimed in claim 1 including biasing means mounted on said body portion operable to urge the sealing rib against the sealing surface of the wall member.

4. A seal as claimed in claim 1 wherein said fin-shaped elements extend radially outwardly and radially inwardly from said sealing rib.

5. A seal for relatively rotatable members such as a shaft member which engages through an opening in a wall member having a first sealing surface disposed generally transversely to the shaft member and a second sealing surface disposed generally parallel to the surface of the shaft member comprising a body portion adapted to be mounted on said shaft member, a first flexible lip projecting angularly from the body portion and having a first circumferential sealing rib adapted to engage the first sealing surface of the wall member, a plurality of radially extending first fin-shaped elements projecting from the outer edge of said first sealing lip adapted to press with a light pressure against the first sealing surface with freely suspended edges which are disposed generally parallel to the sealing surface and which, due to friction on relative rotation between the members, deflect rearwardly in relation to the direction of movement of the sealing rib and the first sealing surface thereby providing a pumping effect directed radially outwardly from the sealing rib, a second sealing rib projecting from the body portion adapted to engage the second sealing surface of the wall member and a plurality of axially extending second fin-shaped elements adapted to engage the second sealing surface of the wall member.

References Cited
UNITED STATES PATENTS

| 3,038,733 | 6/1962 | Hudson et al. | 277—95 |
| 3,504,917 | 4/1970 | Malmstrom | 277—25 |

FOREIGN PATENTS

| 1,916,214 | 10/1969 | Germany | 277—134 |

ROBERT I. SMITH, Primary Examiner

U.S. Cl. X.R.

277—134